(12) United States Patent
Yamamoto

(10) Patent No.: US 7,110,141 B2
(45) Date of Patent: Sep. 19, 2006

(54) IMAGE PROCESSING APPARATUS AND METHOD INTENSIVELY PROVIDING DOTS IN HALFTONE PROCESS

(75) Inventor: Toshitsugu Yamamoto, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 854 days.

(21) Appl. No.: 09/817,035

(22) Filed: Mar. 27, 2001

(65) Prior Publication Data

US 2001/0028468 A1    Oct. 11, 2001

(30) Foreign Application Priority Data

Mar. 30, 2000    (JP)    ............................. 2000-093149

(51) Int. Cl.
*H04N 1/405*    (2006.01)
(52) U.S. Cl. ................... 358/1.9; 358/3.03; 382/252
(58) Field of Classification Search ............... 358/3.03, 358/3.04, 3.05, 1.9, 3.01, 3.21, 3.22; 382/252, 382/251, 232, 237
See application file for complete search history.

(56) References Cited

U.S. PATENT DOCUMENTS

| | | | |
|---|---|---|---|
| 5,581,371 A | * | 12/1996 | Spaulding et al. ......... 358/3.03 |
| 5,708,728 A | * | 1/1998 | Nomura ..................... 382/162 |
| 5,809,177 A | * | 9/1998 | Metcalfe et al. ............ 382/251 |
| 6,697,169 B1 | * | 2/2004 | Feng et al. ................. 358/3.04 |

OTHER PUBLICATIONS

"Digital Halftoning", by Robert Ulichney, pp. 239-264.

* cited by examiner

*Primary Examiner*—Thomas D. Lee
(74) *Attorney, Agent, or Firm*—McDermott Will & Emery LLP

(57) ABSTRACT

There is provided an image processing apparatus, operating as described below, employing an error distribution method to perform a halftone process intensively providing dots to achieve high resolution and a high level of tone representation simultaneously. The image processing apparatus, employing the error distribution method to convert an image represented by multiple values into an image provided in binary representation, employs a distribution weighting coefficient to distribute an error caused at a target pixel to a neighboring pixel. The distribution weighting coefficient simply decreases and ultimately attains zero as the distance from the target pixel increases, and the distance extending to attain zero is also set to vary with direction. Such a distribution weighting coefficient allows a halftone process providing dots intensively.

9 Claims, 20 Drawing Sheets

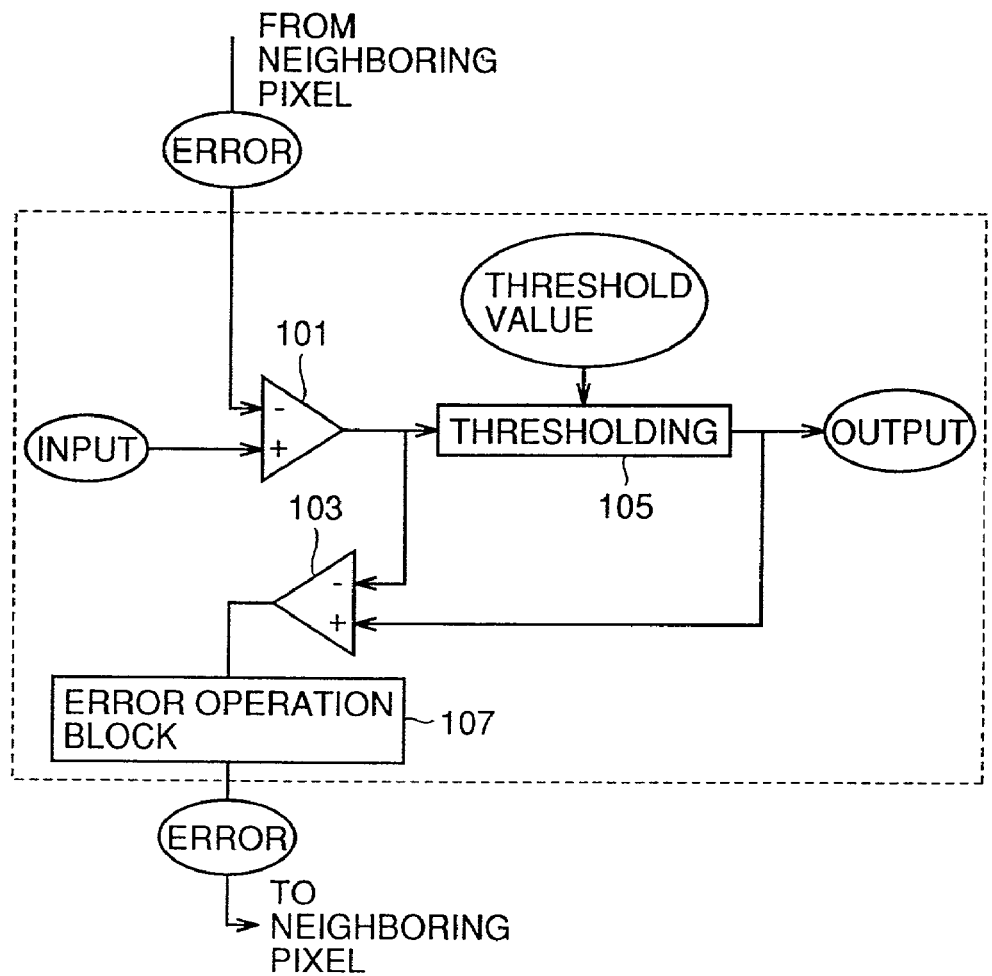

FIG.6

|   |   |   |   | X | 4 | 3 | 2 | 1 |   |
|---|---|---|---|---|---|---|---|---|---|
| 1 | 2 | 3 | 4 | 4 | 4 | 3 | 2 | 1 |   |
| 1 | 2 | 3 | 3 | 3 | 3 | 3 | 2 | 1 |   |
| 1 | 2 | 2 | 2 | 2 | 2 | 2 | 2 | 1 |   |
| 1 | 1 | 1 | 1 | 1 | 1 | 1 | 1 | 1 |   |

ITH PIXEL

PATTERN SIGNAL
= P (i%4 − 1.5) / 4
P:   MAGNITUDE OF SIGNAL
i:   PIXEL NUMBER
i%4:   REMAINDER OF i DIVIDED BY 4

P = 0.1 (INPUT = 0 TO 1)

PSEUDO CONTOUR

TRAIN WITH REMAINDER OF 0

TRAIN WITH REMAINDER OF 0

LINE PATTERN SIGNAL APPLIED TO THRESHOLD VALUE
= P × ((-i / 3 + j)%4 - 1.5) / 3
i, j: PIXEL OF ITH ROW AND JTH COLUMN
P: MAGNITUDE (OF 0.1 HEREIN)
%4: REMAINDER OF DIVISION BY 4

LINE PATTERN SIGNAL APPLIED TO THRESHOLD VALUE
= P × ((i − j / 3)%4 − 1.5) / 3
i,j: PIXEL OF ITH ROW AND JTH COLUMN
P: MAGNITUDE (OF 0.15 HEREIN)
%4: REMAINDER OF DIVISION BY 4

IMAGE PROCESSING APPARATUS AND METHOD INTENSIVELY PROVIDING DOTS IN HALFTONE PROCESS

This application is based on application No. 2000-93149 filed in Japan, the content of which is hereby incorporated by reference.

BACKGROUND OF THE INVENTION

1. Field of the Invention

The present invention relates generally to image processing apparatus and methods and particularly to image processing apparatus and methods employing an error distribution method to perform a halftone process intensively providing dots to achieve both high resolution and a high level of tone representation.

2. Description of the Related Art

In electronic photography, dithering intensively providing dots is often employed to stabilize dots that are output. Dithering, however, has a disadvantage that it hardly provides a high level of tone representation and high resolution simultaneously. More specifically, if high resolution is desired and a dithering pattern is accordingly reduced then tone representation is impaired and if a high level of tone representation is desired and a dithering pattern is accordingly increased then the high level of resolution would not be achieved.

For example if a printer having a resolution of approximately 600 dpi, a currently main level of resolution, is used to achieve a high resolution of 150 lines, a dithering pattern of 4×4 would be employed. This only provides tone representation of 4×4 or 16 gray levels and natural image representation would not be achieved, since it requires at least approximately 60 gray levels. If a dithering pattern of approximately 8×8 is employed to achieve a tone representation of approximately 60 gray levels, however, resolution would be decreased to 75 lines.

Reiner Eschbach suggests intensively providing dots by adding a large dithering pattern to a threshold value in an error distribution method to achieve both a high level of tone representation and high resolution in a halftoning process. To intensively provide dots in this technique, a signal (i.e., a dithering pattern) approximately five times in magnitude the range of an input must be added to the threshold value. In this technique, a large pattern signal is added and the resultant image is thus impaired in sharpness. As such an edge emphasis process is also required. The technique is also disadvantageous in that the threshold can hardly have added thereto a pattern formed of closely arranged parallel lines. While this technique does establish both a high level of tone representation and a high resolution, it does not provide sufficiently fine images.

Thus an image processing including dithering is disadvantageous as it fails to provide high resolution and a high level of tone representation simultaneously. Reiner Eschback's error distribution method is also disadvantageous as (1) it does not provide an image with better granularity than dithering, (2) it can hardly employ a pattern formed of closely arranged parallel lines, (3) to output for example a black letter clearly, an edge emphasis process (for example providing a threshold value in inverse proportion to an input) is required, and (4) an input significantly changes a texture and a pseudo contour thus results.

SUMMARY OF THE INVENTION

The present invention is made to overcome the disadvantages described above and it contemplates an image processing apparatus and method capable of providing a halftone process providing dots intensively and also achieving high solution and a high level of tone representation simultaneously.

To achieve the above object the present invention in one aspect provides an image processing apparatus employing an error distribution process to convert an image represented with multiple values into an image provided in binary representation, including:

an input block subtracting from data of a target pixel successively input an error from a neighboring pixel;

a thresholding block thresholding and outputting the data of the target pixel subjected to a subtraction in the input block;

an error calculation block subtracting from a thresholded value output from the thresholding block a value corresponding to the data of the target pixel having been subjected to the subtraction in the input block and not yet thresholded, to obtain an error; and an error operation block multiplying the error obtained in the error calculation block by a distribution weighting coefficient to calculate an error to be distributed to a neighboring pixel before the neighboring pixel is processed, wherein the distribution weighting coefficient simply decreases and ultimately reaches zero as a distance from the target pixel increases, and a distance extending to attain zero varies with direction.

The present invention in another aspect provides a method of processing an image, employing an error distribution process to convert an image represented with multiple values into an image provided in binary representation, including the steps of:

subtracting from data of a target pixel successively input an error from a neighboring pixel;

thresholding and thus outputting the data of the target pixel subjected to a subtraction in the step of subtracting;

subtracting from a thresholded value output a value corresponding to the data of the target pixel successively input and then subjected to the subtraction, to obtain an error; and multiplying the error by a distribution weighting coefficient to calculate an error to be distributed to a neighboring pixel before the neighboring pixel is processed, wherein the distribution weighting coefficient simply decreases and ultimately reaches zero as a distance from the target pixel increases, and a distance extending to attain zero varies with direction.

The present invention in still another aspect provides an image processing apparatus employing an error distribution process to convert an image represented with multiple values into an image provided in binary representation, including:

an input block subtracting from data of a target pixel successively input an error from a neighboring pixel;

a thresholding block thresholding and outputting the data of the target pixel subjected to a subtraction in the input block;

an error calculation block subtracting from a thresholded value output from the thresholding block a value corresponding to the data of the target pixel having been subjected to the subtraction in the input block and not yet thresholded, to obtain an error; and an error operation block multiplying the error obtained in the error calculation block by a distribution weighting coefficient to calculate an error to be distributed to a neighboring pixel before the neighboring pixel is processed, wherein the distribution weighting coefficient introduces into an output image a pattern formed of lines.

The present invention in still another aspect provides an image processing apparatus employing an error distribution process to convert an image represented with multiple values into an image provided in binary representation, including:

an input block subtracting from data of a target pixel successively input an error from a neighboring pixel;

a thresholding block thresholding and outputting the data of the target pixel subjected to a subtraction in the input block;

an error calculation block subtracting from a thresholded value output from the thresholding block a value corresponding to the data of the target pixel having been subjected to the subtraction in the input block and not yet thresholded, to obtain an error; and an error operation block multiplying the error obtained in the error calculation block by a distribution weighting coefficient to calculate an error to be distributed to a neighboring pixel before the neighboring pixel is processed, wherein an image pattern related to an image pattern introduced into an output image that is attributed to the distribution weighting coefficient, is added to the data of the target pixel input or the threshold value.

The present invention in still another aspect provides an image processing apparatus employing an error distribution process to convert an image represented with multiple values into an image provided in binary representation, including:

an input block subtracting from data of a target pixel successively input an error from a neighboring pixel;

a thresholding block thresholding and outputting the data of the target pixel subjected to a subtraction in the input block;

an error calculation block subtracting from a thresholded value output from the thresholding block a value corresponding to the data of the target pixel having been subjected to the subtraction in the input block and not yet thresholded, to obtain an error;

an error operation block multiplying an error obtained from the error calculation block by a distribution weighting coefficient to calculate an error to be distributed to a neighboring pixel before the neighboring pixel is processed, the distribution weighting coefficient simply decreasing as a distance from the target pixel increases; and a threshold operation block adding to a threshold value used in the thresholding block a second image pattern related to a first image pattern introduced into an output image as a result of an image processing provided by the input block, the thresholding block, the error calculation block and the error operation block.

The present invention in still another aspect provides a method of processing an image, employing an error distribution process to convert an image represented with multiple values into an image provided in binary representation, including the steps of:

subtracting from data of a target pixel successively input an error from a neighboring pixel;

thresholding and thus outputting the data of the target pixel subjected to a subtraction in the step of subtracting;

subtracting from the value thresholded and output a value corresponding to the data of the target pixel having been subjected to the subtraction and not yet thresholded, to obtain an error; and multiplying the error by a distribution weighting coefficient to calculate an error to be distributed to a neighboring pixel before the neighboring pixel is processed, the distribution weighting coefficient simply decreasing as a distance from the target pixel increases, wherein a series of the steps provides an image processing providing an output image having a first image pattern introduced therein and a second image pattern related to the first image pattern is added to the threshold value.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the figures:

FIG. 1 represents an algorithm of an error distribution method implemented by an image processing apparatus in a first embodiment of the present invention;

FIG. 2 illustrates a distribution weighting coefficient employed in the image processing apparatus of the first embodiment;

FIG. 6 shows a variation of the distribution weighting coefficient;

DESCRIPTION OF THE PREFERRED EMBODIMENTS

First Embodiment

Figure 3:
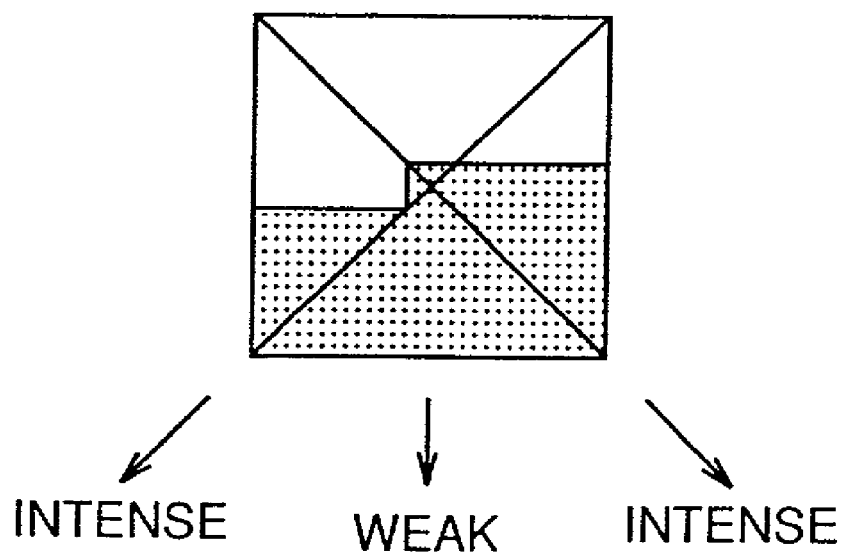
FIG. 3 illustrates a characteristic of an error distribution provided by the FIG. 2 distribution weighting coefficient.

The present embodiment in a first embodiment provides an image processing apparatus as will now be described. The present embodiment provides an image processing apparatus employing an error distribution method to process an image. In the error distribution method a distribution weighting coefficient is adjusted in distribution to allow an output image to have dots intensively provided.

When the distribution weighting coefficient is adjusted in distribution to provide dots intensively, the dots are intensively provided at a location determined depending on an input signal. As such while an image has dots intensively provided it can also have high resolution. Since the error distribution method is employed, a high level of tone reproduction can also be achieved. Thus in the present embodiment the image processing apparatus can provide halftoning for electronic photography.

Furthermore in the present embodiment an output image can be significantly sharp and an edge emphasis process can thus be dispensed with. (An edge emphasis process may of courses be provided.)

FIG. 1 represents an algorithm of an error distribution method implemented by the present image processing apparatus of the first embodiment. As shown in the figure, a subtracter 101 subtracts from an input (a value in density of a single pixel) an error from a neighboring pixel. The resultant value is thresholded by a thresholding block 105 for output. Subtracter 103 subtracts from the thresholded value the value obtained before it is thresholded. The obtained value is input to an error operation block 107 and processed according to a distribution weighting coefficient. The obtained value is distributed as an error to pixels having their output values undetermined.

Once an error is introduced, it is added to an input value and thus distributed endlessly. As such, as seen in a large area, an input value is reproduced as an average value, and a high level of tone representation is thus ensured. If an input value changes, the change is rapidly reflected in an output and high resolution is thus also achieved.

In an error distribution method an error can be freely distributed to surrounding pixels. If a weight employed to distribute an error to surrounding pixels is changed, a pattern having dots arranged is created.

FIG. 2 represents a distribution weighting coefficient employed when in the present embodiment the image processing apparatus distributes an error introduced at a target pixel (a pixel to be processed) to neighboring pixels.

An error introduced into a pixel X (a target pixel) is distributed to pixels 1–3. The error is distributed to pixels 3, 2 and 1 by $3/40$, $2/40$ and $1/40$, respectively.

Furthermore as shown in FIG. 2 the distribution weighting coefficient simply decreases as the distance from target pixel X increases, and the coefficient finally reaches 0 and the distance extending to attain 0 also varies with direction. More specifically, with target pixel X serving as a center, the distance in which the distribution weighting coefficient reaches 0 is longer in the downward right direction and the downward left direction than the right direction and the downward direction.

Figure 4:
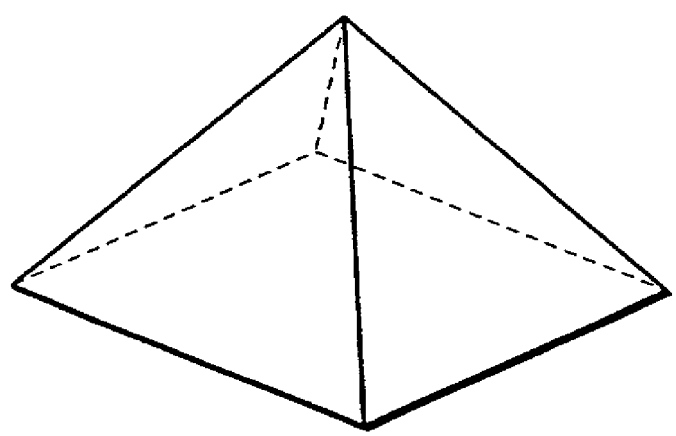
FIG. 4 illustrates an amount in which a distribution weighting coefficient reduces.

Thus as shown in FIG. 3 with the target pixel as a center an error is distributed farther in the downward right direction and the downward left direction. In other words, the error is distributed more significantly. In contrast, the error is not distributed so far in the downward direction. In other words, the error is distributed less significantly. Note that if the distribution weighting coefficient is represented as having a height, it would be represented in the form of a pyramid, as shown in FIG. 4, with the target pixel serving as a center.

Figure 5:
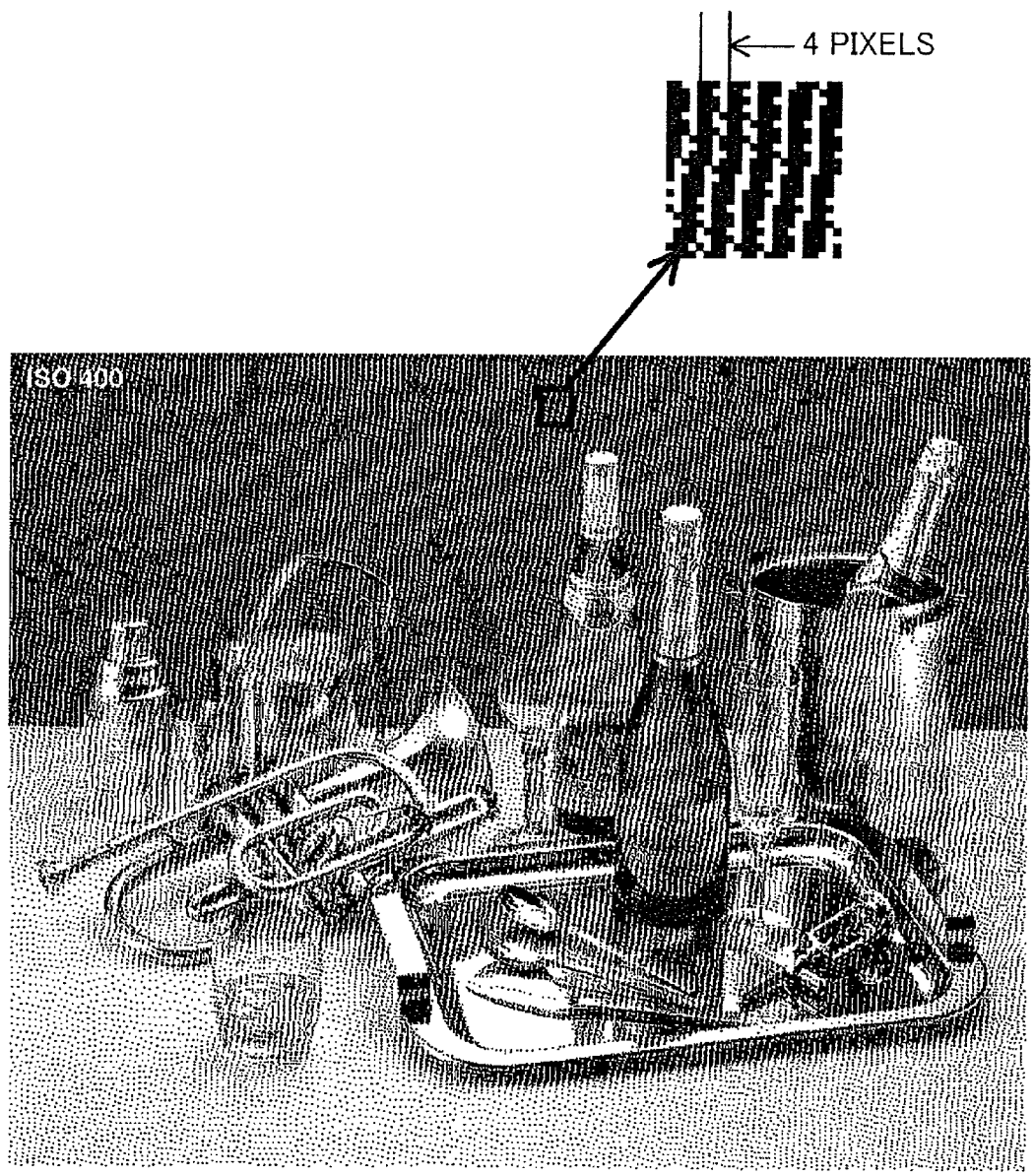
FIG. 5 shows a result of an image processing in the first embodiment.

FIG. 5 shows a result of an output of the image processing apparatus of the present embodiment. With the FIG. 2 distribution weighting coefficient adopted, an output image tends to have dots arranged vertically in closely arranged parallel lines successively. The lines have a pitch (four pixels in FIG. 5) in proportion to a range in which an error is distributed.

Figure 6:
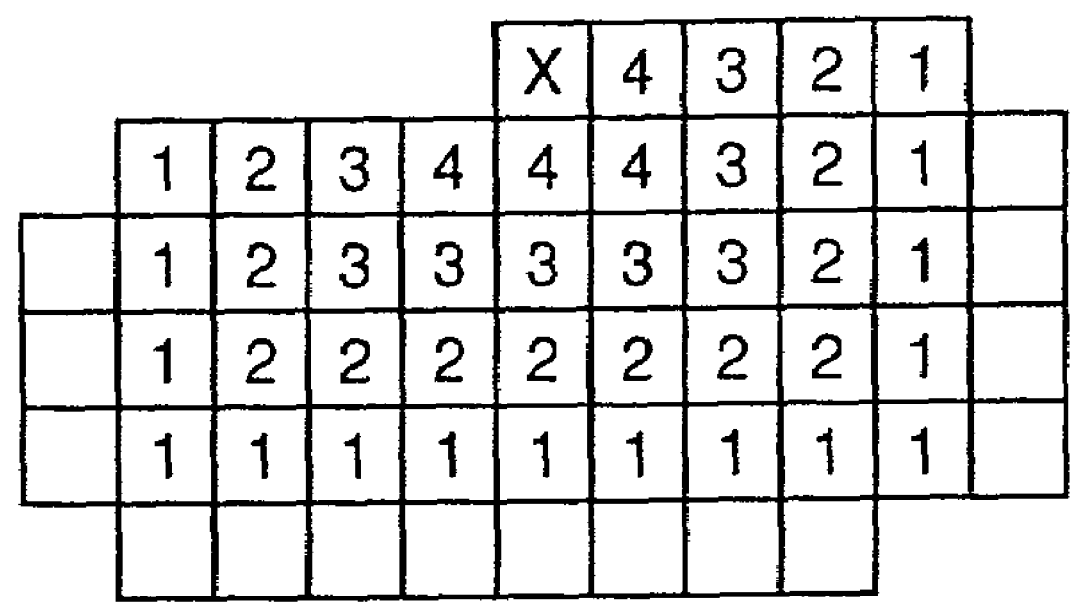
Figure 7:
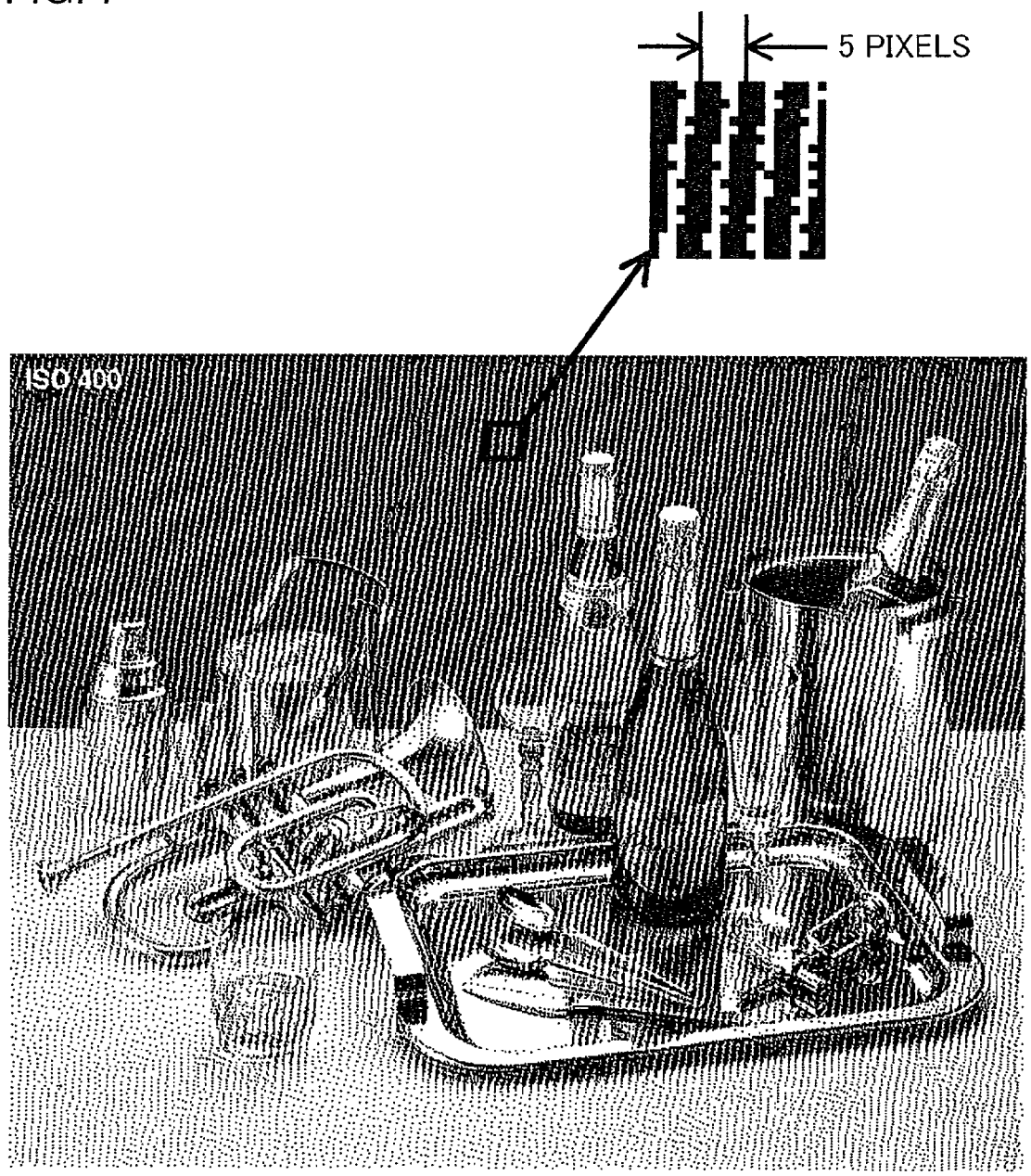
FIG. 7 shows a result of processing an image by using the FIG. 6 distribution weighting coefficient.

FIG. 6 represents another exemplary distribution weighting coefficient. This coefficient reduces simply from four to zero as the distance from target pixel X increases. Furthermore, the distance in which zero is attained is longer in the downward right direction and the downward left direction and shorter in the left direction, the right direction and the downward direction, as is similar to FIG. 2. FIG. 7 shows an image subjected to an error distribution process employing the FIG. 6 distribution weighting coefficient. As shown in FIG. 7, this weighting results in dots being intensively provided for every five pixels to provide a pattern formed of closely arranged parallel lines (hereafter also referred to simply as a "line pattern").

Second Embodiment

In the first embodiment, a distribution weighting coefficient is simply changed to intensively provide dots. This, however, provides dots intensively in an unstable pattern. Accordingly, in the second embodiment a pattern is added to a threshold value in an error distribution method. More specifically, a pattern related to a pattern introduced into an output signal by adjusting a distribution weighting coefficient, is added to a threshold value to stabilize a pattern formed of closely arranged parallel lines that is output. For an input signal free of a significant change, dots are intensively provided along a pattern formed of closely arranged parallel lines that is added. As such, a pattern formed of regularly, closely arranged parallel lines can be obtained.

Figure 8:
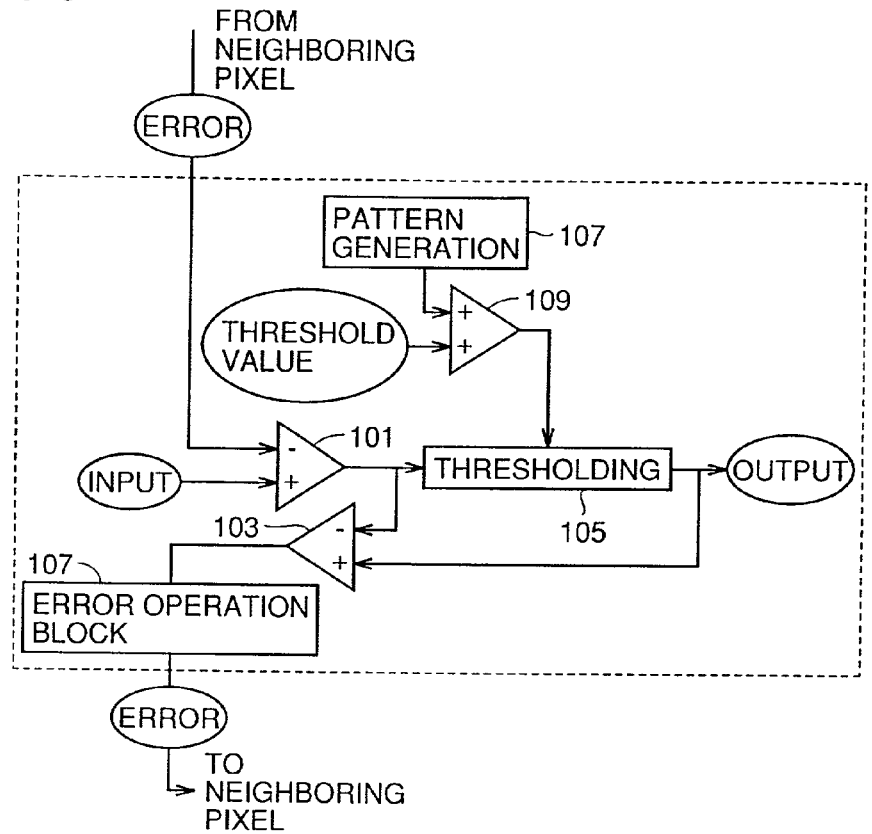
FIG. 8 represents an algorithm of an error distribution method implemented by an image processing apparatus in a second embodiment of the present invention.

FIG. 8 represents an algorithm of an error distribution method implemented by the image processing apparatus of the second embodiment. In the present embodiment, a pattern generator 107 generates a pattern signal which is received by an adder 109 and thus added to a threshold value to provide a modified threshold value which is employed by a thresholding block 105.

Figure 9:
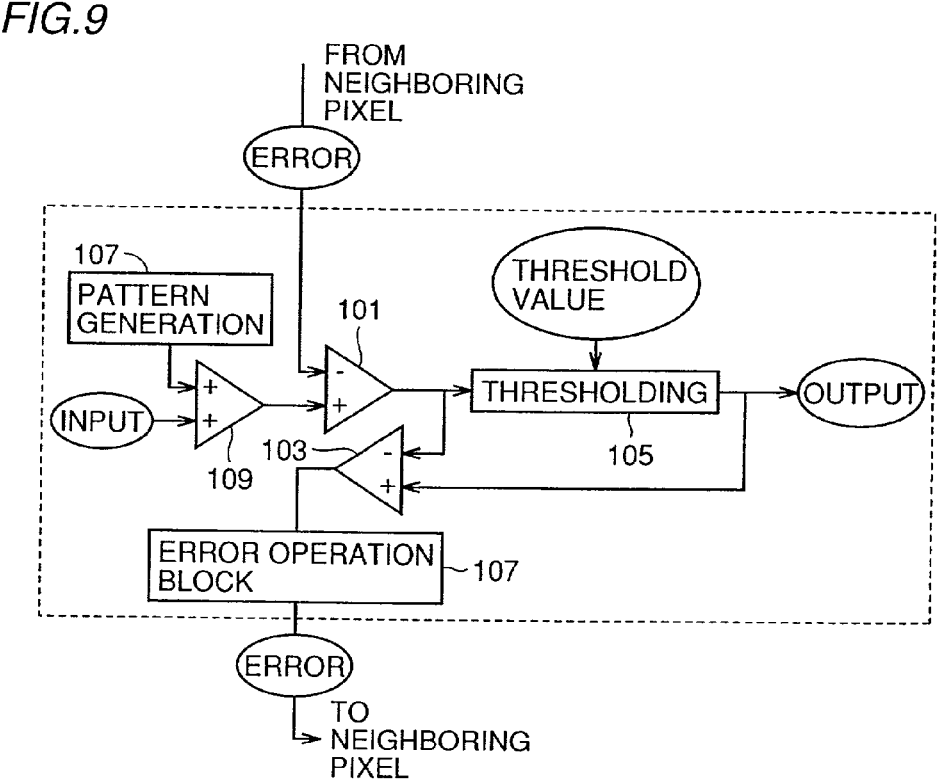
FIG. 9 shows a variation of the FIG. 8 algorithm.

Note that while in the present embodiment a pattern is added to a threshold value, as shown in FIG. 8, a pattern generated by pattern generator 107 may alternatively be added to an input signal (a value of a pixel of an image represented with multiple values that is to be processed), as shown in FIG. 9.

Figure 10:
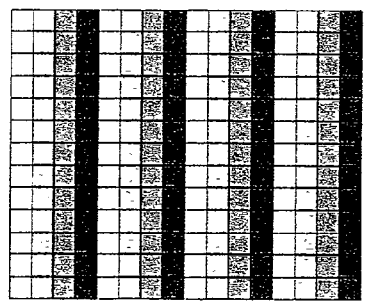
FIG. 10 shows a pattern applied to a threshold value in the second embodiment.

FIG. 10 is a diagram for illustrating a pattern generated by pattern generator 107. A pixel to be processed is numbered and for each pixel number a signal to be added is changed. If P represents the magnitude of a signal, i represents the number of a pixel and i %4 represents the remainder of i divided by four, then a pattern signal is represented by P (i %4−1.5)/4. Note that for an input in a range of zero to one, desirably P is approximately 0.1 to adapt a pattern signal to be approximately 10% of an input signal.

Figure 11:
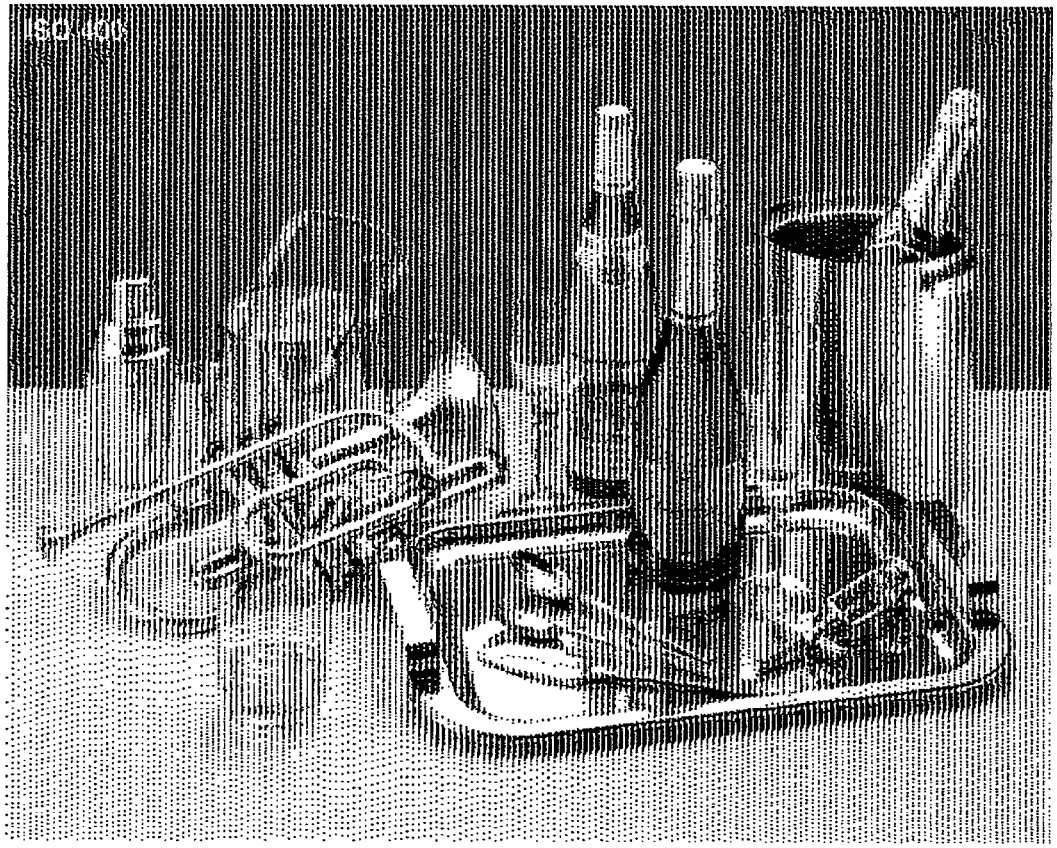
FIG. 11 shows a result of outputting an image in the second embodiment.

FIG. 11 shows an image output from the image processing apparatus of the second embodiment. As shown in the figure, in the present embodiment an image can be stabilized by more or less adding to a threshold value (or an input value) a pattern formed of closely arranged parallel lines.

Third Embodiment

The first and second embodiments provide image processing capable of providing both of a high level of tone representation and high resolution simultaneously while intensively providing dots, although they suffer a pseudo contour.

Figure 12:
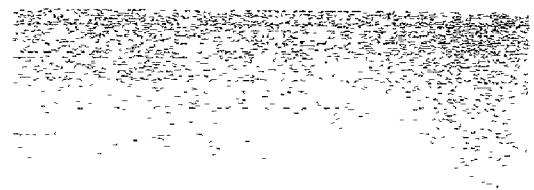
FIG. 12 shows an example of a gradational image.
Figure 13:
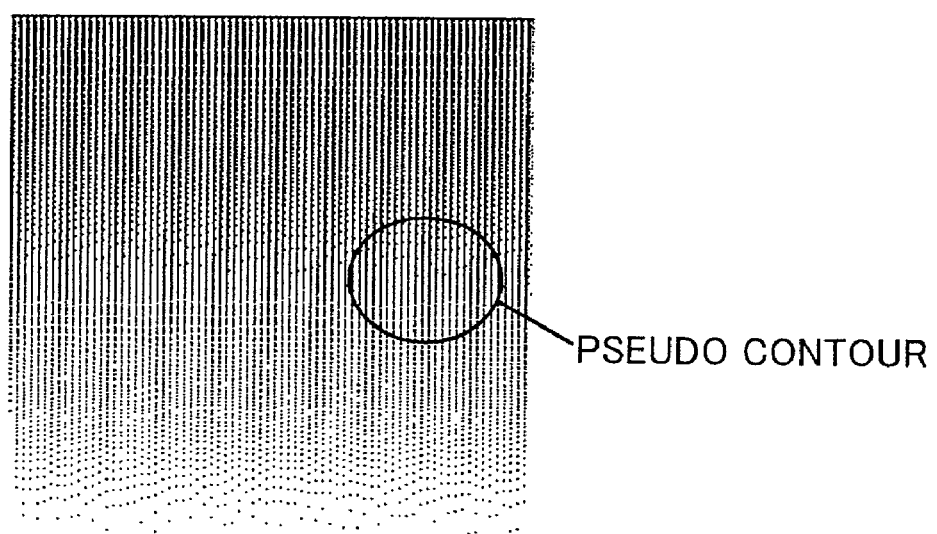
FIG. 13 shows the FIG. 12 image that is processed in the second embodiment.

For example, FIG. 13 shows a result obtained when the image processing apparatus of the second embodiment processes an image represented with multiple values and having a gradation as shown in FIG. 12. With reference to FIG. 13, in this example dots are intensively provided laterally for every four pixels to form closely arranged parallel lines. If dots are intensively provided for every four pixels then for an input value corresponding to a multiple of one fourth the dot arrangement is completely of a linear component. In the FIG. 13 example, the image around its center has a dot density of one fourth. In this portion an area with an image configured only of lines extends, more than required. This area, as visually recognized with human eye, appears to be a gray band. This portion corresponds to a pseudo contour.

Figure 14:
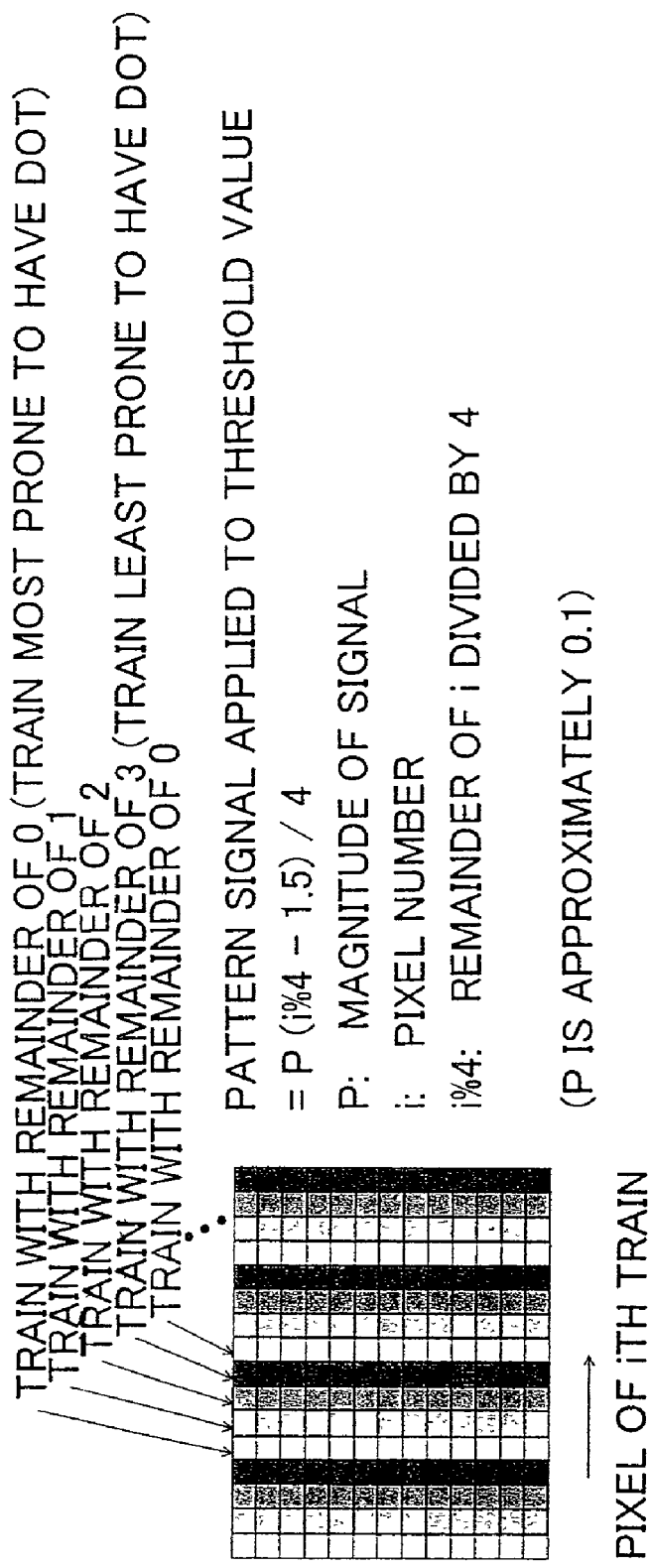
FIG. 14 illustrates how a pseudo contour results.

Dots are arranged in a line because distribution weighting varies in intensity with direction. Once dots start to make a line, data would be processed to maintain the state, for a reason described below:

With reference to FIG. 14, in the second embodiment a similar thresholding process is provided for a four-pixel period. For the sake of convenience, a pixel train will be referred to as a remainder of its train number divided by four. More specifically, a train with a remainder of one is a train having a remainder of one when its train number is divided by four.

With reference to FIG. 14, in a train with a remainder of zero dots more readily appear than in the other trains because of the smallest threshold value. In contrast, in a train with a remainder of three dots less readily appear than in the other trains because of the largest threshold value. In general, a pattern formed of closely arranged parallel lines is introduced into a dot-prone train with a remainder of zero.

Figure 15:
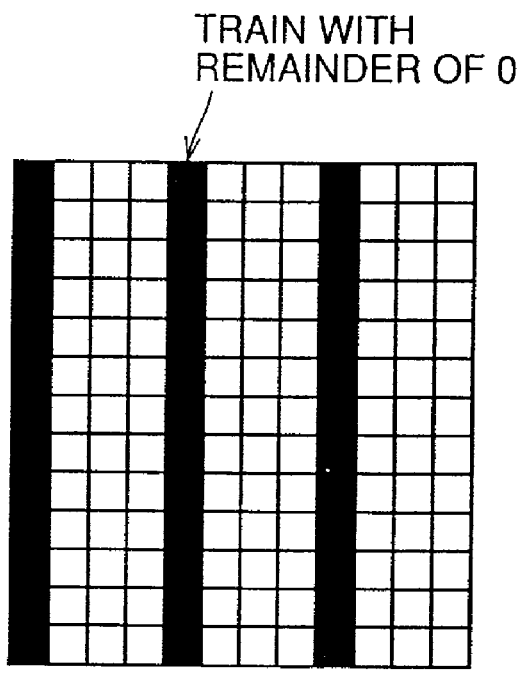
FIG. 15 shows an image output for an input value of one fourth.
Figure 16:
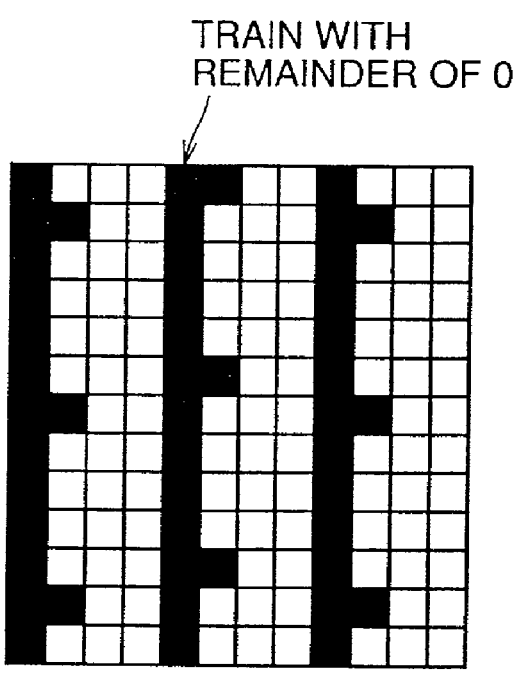
FIG. 16 shows an image output for an input value slightly greater than one fourth.

As shown in FIG. 15, when an input is one fourth an output image has dots continuously output on a train with a remainder of zero and it does not have dots on the other trains. Thus an image formed only of a linear component is output. If an output is slightly larger than one fourth then an output image is the FIG. 15 output with some dots added on a train with a remainder of one, as shown in FIG. 16. In contrast, if an input is slightly smaller than one fourth then an output image has the FIG. 15 condition with some dots thinned out, as shown in FIG. 17.

When an input is slightly greater than one fourth, on a train with a remainder of zero, although the threshold value is small, an input value modified by an error (a modified input) is greater than pixels of the other trains (of course including a train with a remainder of one). This is because distribution weighting is smaller (weaker) in the vertical direction than in the other direction. Thus on a train with a remainder of zero dots are output steadily in the vertical direction successively.

Figure 17:
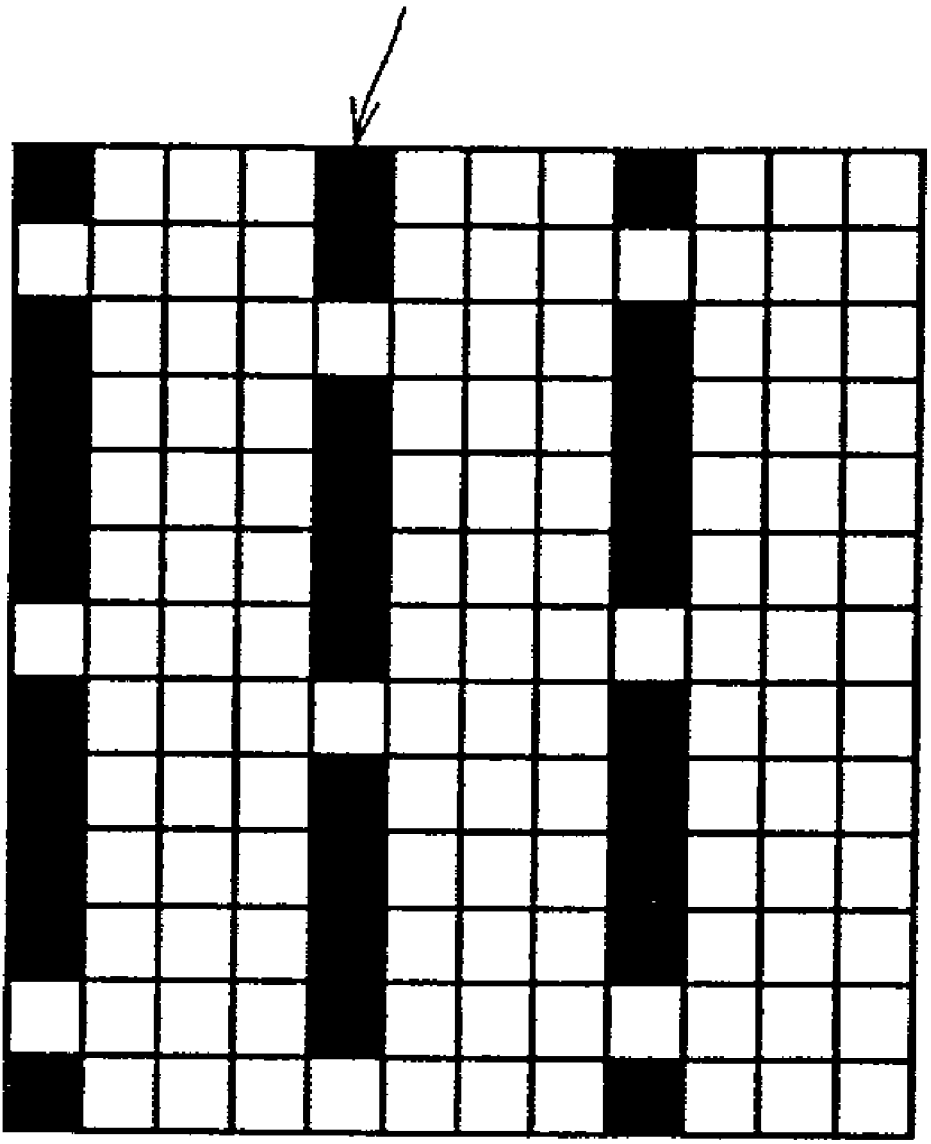
FIG. 17 shows an image output for an input value slightly smaller than one fourth.

As an input value is reduced due to gradation and when it reaches a value smaller than one fourth there must be shifted to a condition in which a train with a remainder of zero locally has pixels free of dots output (FIG. 17). Since for an input value greater than one fourth a modified input has diverted from a threshold value and thus been significantly increased, to reduce it to be smaller than the threshold value to prevent a dot from being output a certain distance is required. Since the distance is increased more than required, an area formed only of a linear component, as shown in FIG. 15, continues to extend.

The third embodiment overcomes the above disadvantage by shifting laterally little by little the position of a pattern formed of closely arranged parallel lines that is added to a threshold value (or an input value). This can prevent an input modified by a pattern or a threshold value from being too large a value only on a pixel train. Furthermore an uneven value of a pixel of each train can be resolved by moving a line to an adjacent train.

Figure 18:
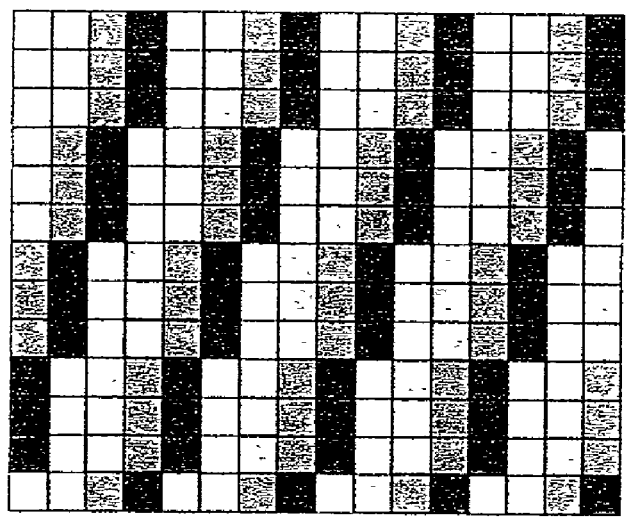
FIG. 18 shows a pattern applied to a threshold value in a third embodiment of the present invention.

More specifically, in place of the FIG. 10 pattern the FIG. 18 pattern is applied to a threshold value or an input value. Thus the FIG. 13 image can be changed to the FIG. 19 image, which is free of a pseudo contour. Note that the FIG. 18 pattern can be obtained from the following equation:

$$P \times ((i/3+j)\%4-1.5)/3$$

wherein (i, j) represents a row and column of pixels.

Figure 20:
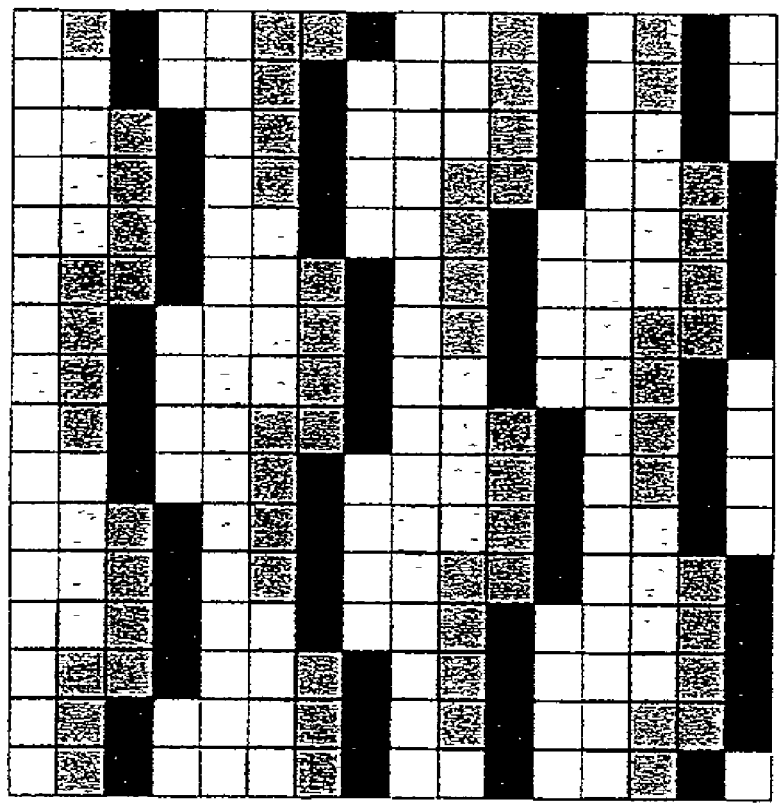
FIG. 20 shows another exemplary pattern applied to a threshold value.

As another specific example, a pattern as shown in FIG. 20 is illustrated. In this example, a vertical line varies, staggering leftward and rightward by one pixel. The FIG. 20 pattern can be obtained from the expression:

$$P \times (((i+((j+i*3/4)/4)\%2))\%4)-1.5)/3$$

wherein (i, j) represents a row and column of pixels.

Thus in the present embodiment a pseudo contour or the like can be prevented by adding for example to a threshold value a pattern having a predetermined angle relative to a pattern that a distribution weighting coefficient introduces into an output image.

Fourth Embodiment

The fourth embodiment prevents color moire in full-color printing by providing a process providing a different pattern of intensively provided dots for each color.

In the first to third embodiments, an output image has a pattern formed of closely arranged parallel lines (formed of dots successively arranged in a single direction). In other words, the pattern has its periodicity only in a single direction. In contrast to typical dithering patterns having their periodicities in two directions, the pattern has a direction of rotation with a degree of freedom of 180°. As such in the fourth embodiment in processing a color image a pattern has its direction changed for each color to prevent the color image from having color moiré.

Figure 21:
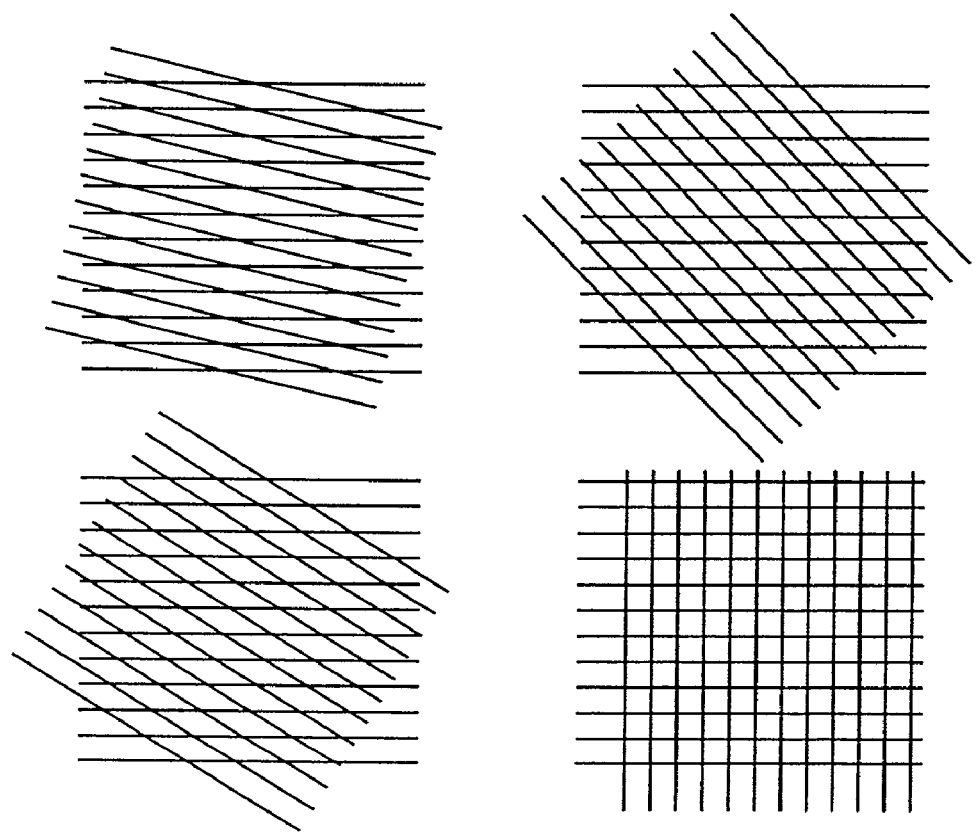
FIG. 21 is a view for illustrating how a pattern formed of closely arranged parallel lines overlaps another pattern formed thereof.
Figure 22:
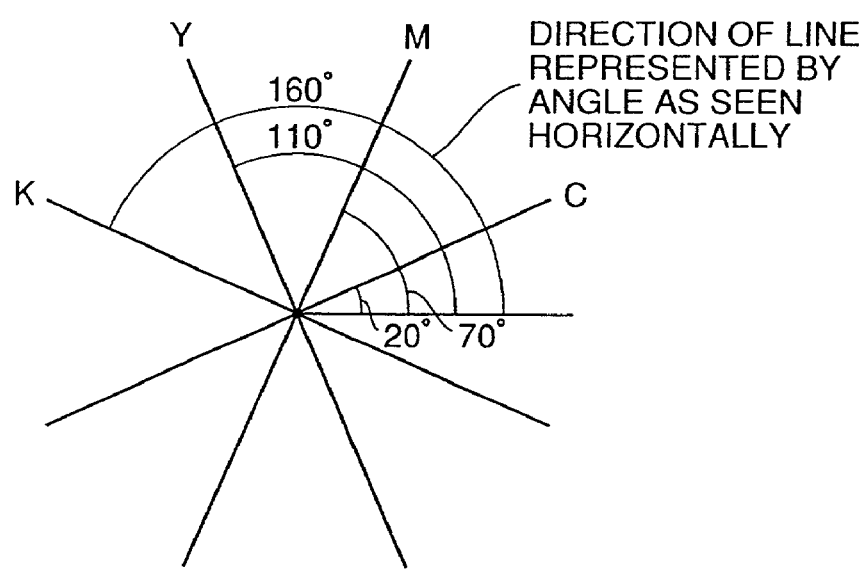
FIG. 22 illustrates a processing in a fourth embodiment of the present invention.

It is better that two different patterns form an angle that is larger as shown in FIG. 21. Introducing a pattern formed of closely arranged parallel lines in the horizontal direction or the vertical direction should be avoided as the pattern would intensify luminosity. For color-printing, the four colors of CMYK are required and desirably lines having four different angles are used. Accordingly, in the present embodiment, as shown in FIG. 22, lines in directions of 20°, 70°, 110° and 160°, respectively, are used as the patterns corresponding to CMYK, respectively.

Figure 19:
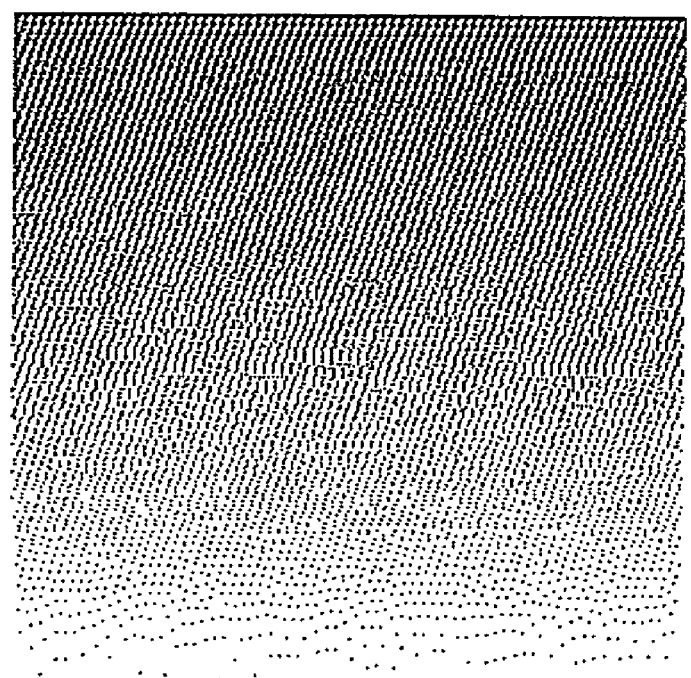
FIG. 19 is a view for illustrating an effect of the third embodiment.

The 70° line pattern (a line pattern corresponding to C) can be output simply by employing the FIG. 2 distribution weighting coefficient and the FIG. 18 pattern (see the image shown in FIG. 19).

Figure 23:
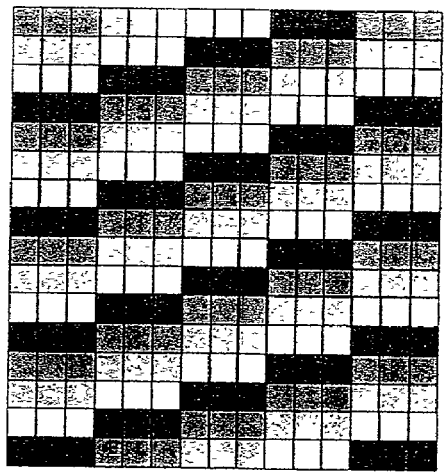
FIG. 23 shows a pattern employed to create a pattern formed of closely arranged parallel lines that is provided in a direction of 110°.

The 110° line pattern can be generated simply by the FIG. 2 distribution weighting coefficient and the FIG. 23 pattern (the 110° line pattern). In this technique, however, texture tends to be more or less unstable in a range of a high dot density (of no less than 60%). In that range, texture is better stabilized by using an inverted version of an image processed in the direction of 70°. More specifically, as shown in FIG. 24(B), an original image is inverted horizontally, the inverted image is subjected to an image processing introducing a line pattern in the direction of 70° and then the resultant image is again inverted horizontally. Thus an image can be obtained with a line pattern in the direction of 110°.

Although an image is inverted, any particular additional process is not introduced as the inversion in effect only involves reading image data from opposite, right and left directions, processing the data and writing the result in the opposite directions.

Figure 24:
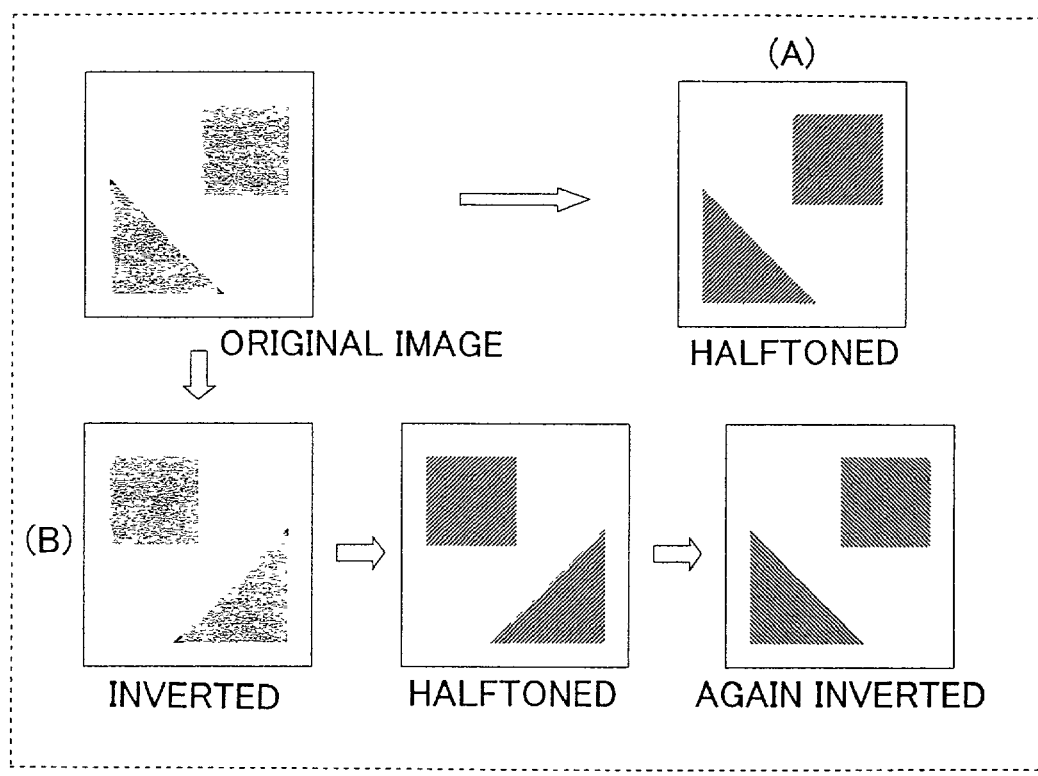
FIG. 24 is a view for illustrating an image inverted, then halftoned and then further inverted.

In the FIG. 24 example, an original image as it is is processed to introduce a 70° line pattern to provide a halftone image (A) to correspond to the color of magenta (M) and, as shown in a process (B), an image for yellow (Y) is initially inverted horizontally and then subjected to an image processing introducing a 70° line pattern and the image thus processed is again inverted to provide an image having a line pattern in the direction of 110°.

Figure 25:
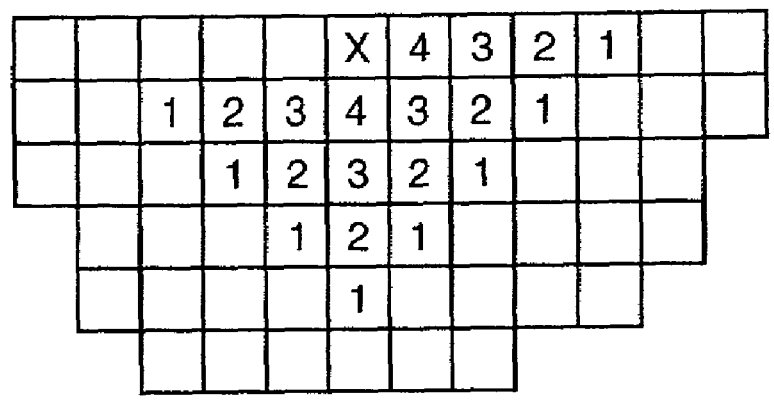
FIG. 25 represents a distribution weighting coefficient employed to create a pattern formed of closely arranged parallel lines that is provided in a direction of 160°.
Figure 26:
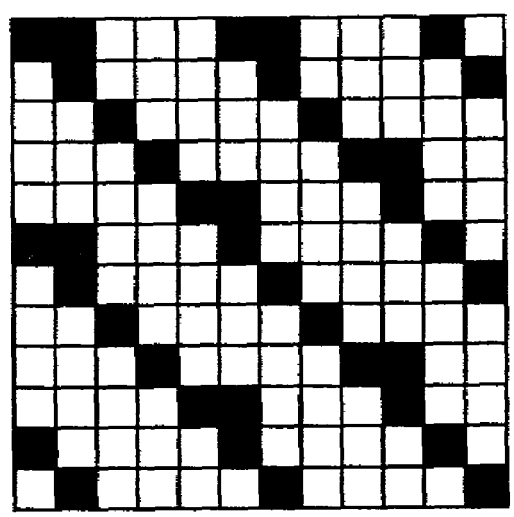
FIG. 26 is a view for illustrating a disadvantage of a pattern formed of closely arranged parallel lines that is provided in a direction of 135°.

To obtain a pattern in the direction of 160°, the FIG. 25 distribution weighting coefficient is required. The FIG. 25 distribution weighting coefficient facilitates arranging dots in the direction of 135°. For a line in the direction of 1350, when an input is slightly greater than a pattern formed of closely arranged parallel line a block of three dots as shown in FIG. 26 is introduced and the screen's smoothness would be significantly impaired. To avoid this, a line should have a direction significantly offset from 135°.

Figure 27:
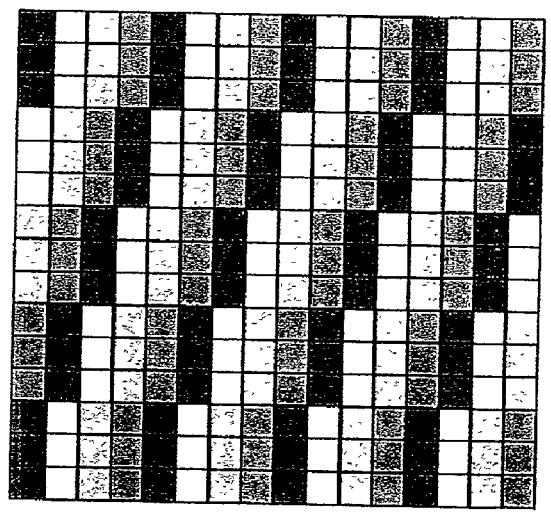
FIG. 27 shows a pattern employed to create a pattern formed of closely arranged parallel lines that is provided in a direction of 160°.

Accordingly also to avoid the problem of pseudo contour and the like the FIG. 25 distribution weighting coefficient is employed and a signal of a line pattern in the direction of 160° as shown in FIG. 27 (corresponding to approximately 15% of a range of an input) is applied to a threshold value or an input value to introduce a line in the direction of 160°. While the process outputting a 160° line would result in a slightly worse texture than that outputting a 70° line, it can provide a higher level of resolution and a higher level of tone representation than fat-dithering.

Note that the FIG. 27 pattern signal is obtained from the equation:

$$P \times ((i-j/3)\%4 - 1.5)/3$$

wherein P is preferably approximately 0.15.

In providing a 20° line pattern, a distribution weighting coefficient used to obtain a 160° line pattern may be employed to shift in the direction of 20° a line pattern signal applied for example to a threshold value, or the process outputting a 160° line may be employed to invert an image, as shown in FIG. 23, to create the 20° line pattern.

Fifth Embodiment

Figure 28:
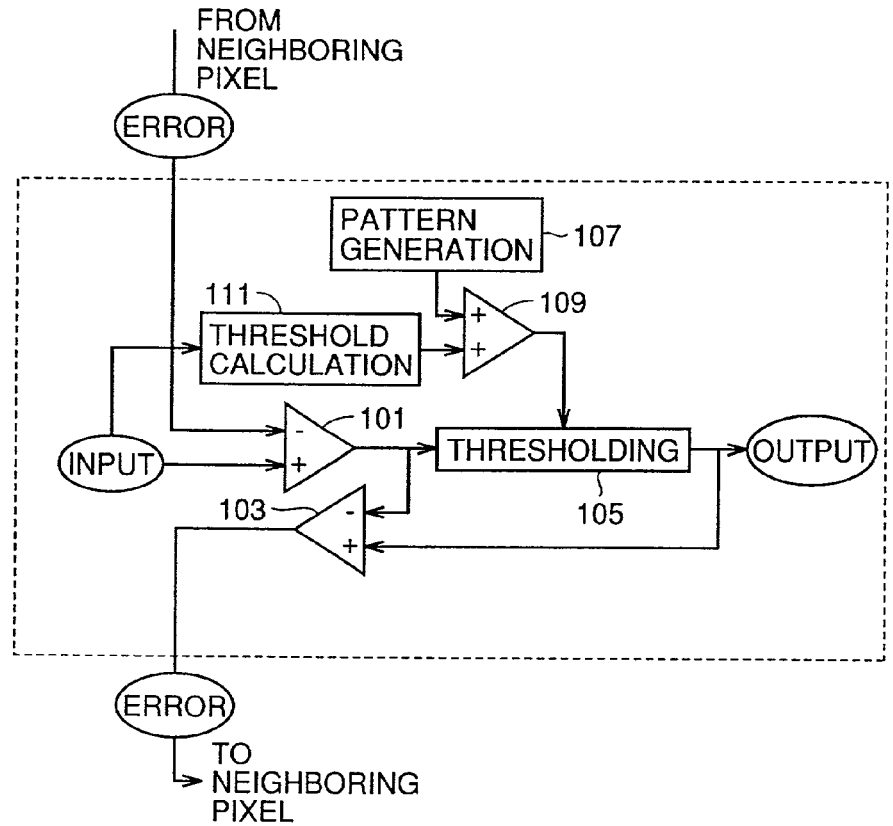
FIG. 28 represents an algorithm of an error distribution method implemented by an image processing apparatus in a fifth embodiment of the present invention.
Figure 29:
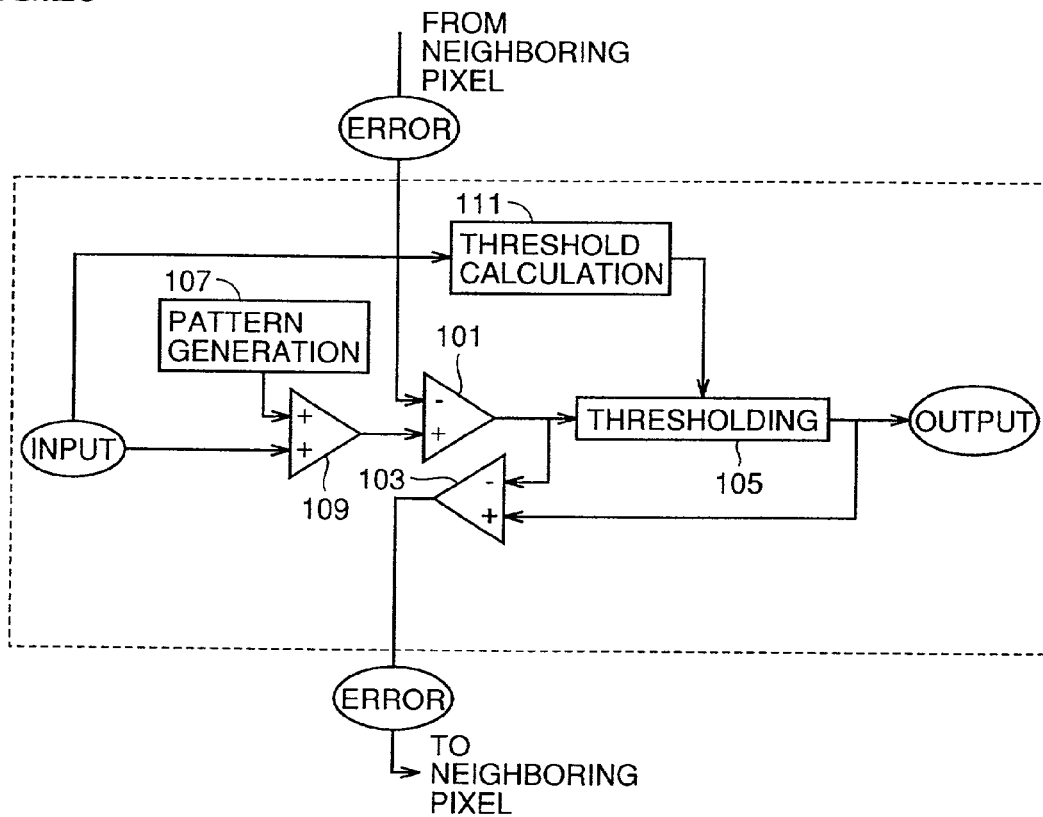
FIG. 29 shows a variation of the FIG. 27 algorithm.

While the above embodiments provide a sharp output image, they suffer a noticeable dot delay. To address this problem the fifth embodiment changes a threshold value to reflect an input value. More specifically, the fifth embodiment adopts the FIGS. 28 and 29 processes rather than the FIGS. 8 and 9 processes. In FIGS. 28 and 29, in response to an input value a thresholding block 111 changes a threshold value.

Figure 30:
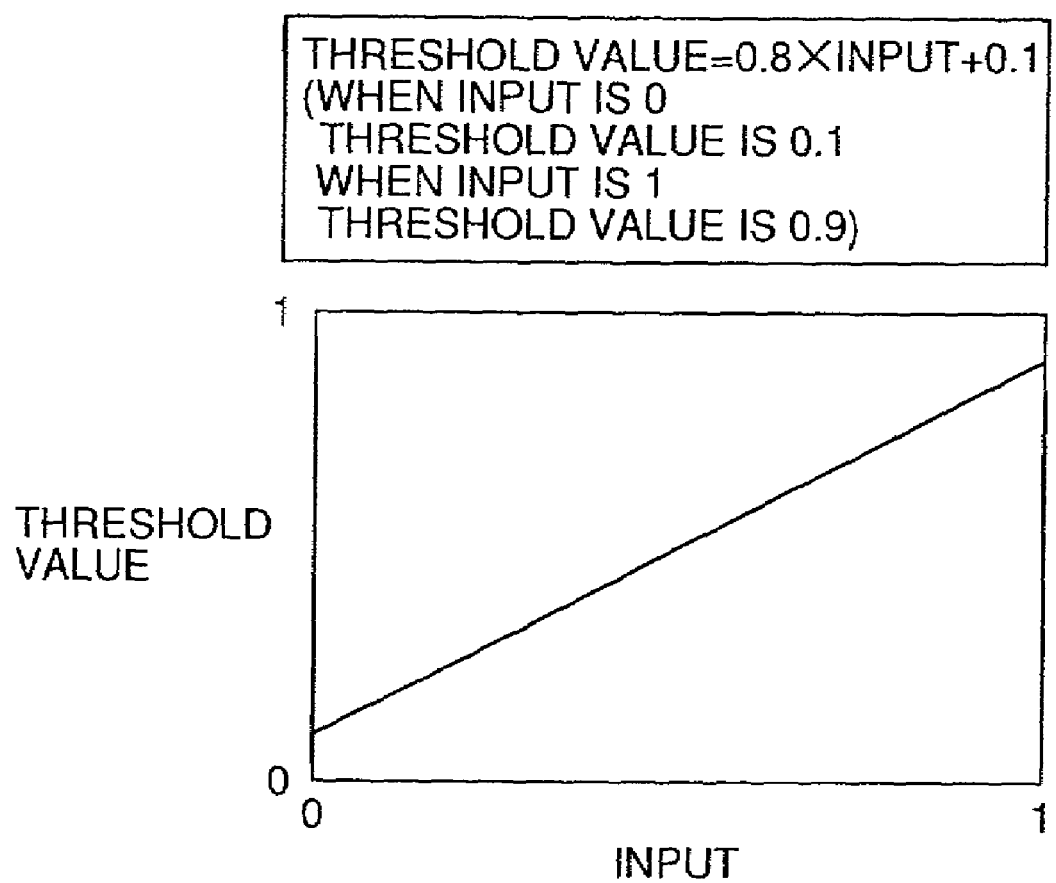
FIG. 30 is a graph for illustrating a threshold value output from a threshold calculation block 111 in the fifth embodiment.

FIG. 30 represents a threshold calculation process provided by threshold calculation block 111. In this example, threshold calculation block 111 is adapted to generate a threshold value of 0.8×an input value+0.1. More specifically, for an input signal of zero a threshold value of 0.1 is provided and for an input signal of 1 a threshold value of 0.9 is provided.

Such a process as above can reduce dot delay.

It should be noted, however, that if the problem of dot delay is addressed too intensively, a contour line could be serrated, affected by a pattern signal applied to a threshold value, when an input shifts from white to black (or vice versa). This problem would be prevented if the threshold value is set to fall within a range of zero to one.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus employing an error distribution process to convert an image represented with multiple values into an image provided in binary representation, comprising:
   an input block subtracting from data of a target pixel successively input an error from a neighboring pixel;
   a thresholding block thresholding and outputting said data of said target pixel subjected to a subtraction in said input block;
   an error calculation block subtracting from a thresholded value output from said thresholding block a value corresponding to said data of said target pixel having been subjected to said subtraction in said input block and not yet thresholded, to obtain an error;
   an error operation block multiplying an error obtained from said error calculation block by a distribution weighting coefficient to calculate an error to be distributed to a neighboring pixel before said neighboring pixel is processed, said distribution weighting coefficient simply decreasing as a distance from said target pixel increases; and
   a threshold operation block adding to a threshold value used in said thresholding block a second image pattern related to a first image pattern introduced into an output image as a result of an image processing provided by said input block, said thresholding block, said error calculation block and said error operation block;

wherein said second image pattern has a predetermined angle, with an absolute value greater than zero, relative to said first image pattern.

2. The image processing apparatus of claim 1, wherein said second image pattern is analogous to said first image pattern.

3. The image processing apparatus of claim 1, wherein in processing a color image, said second image pattern varies in angle for each image of a color obtained by separating an image in color.

4. The image processing apparatus of claim 1, wherein in processing a color image said distribution weighting coefficient varies for each image of a color obtained by separating an image in color.

5. The image processing apparatus of claim 1, wherein in processing a color image said second image pattern varies for each image of a color obtained by separating an image in color.

6. The image processing apparatus of claim 1, wherein said threshold value is changed by said thresholding block based on said input.

7. A method of processing an image, employing an error distribution process to convert an image represented with multiple values into an image provided in binary representation, comprising the steps of:

subtracting from data of a target pixel successively input an error from a neighboring pixel;

thresholding and thus outputting said data of said target pixel subjected to a subtraction in said step of subtracting;

subtracting from said value thresholded and output a value corresponding to said data of said target pixel having been subjected to said subtraction and not yet thresholded, to obtain an error; and multiplying said error by a distribution weighting coefficient to calculate an error to be distributed to a neighboring pixel before said neighboring pixel is processed, said distribution weighting coefficient simply decreasing as a distance from said target pixel increases, wherein a series of said steps provides an image processing providing an output image having a first image pattern introduced therein and a second image pattern related to said first image pattern is added to said threshold value, and wherein said second image pattern has a predetermined angle, with an absolute value greater than zero, relative to said first image pattern.

8. The image processing method of claim 7, wherein in processing a color image, said second image pattern varies in angle for each image of a color obtained by separating an image in color.

9. The image processing method of claim 7, wherein said step of thresholding changes a threshold value based on said input.

* * * * *